United States Patent
Quinn

[15] 3,651,785
[45] Mar. 28, 1972

[54] AQUARIUM HAVING BUILT-IN MEANS TO PREVENT CANNIBALISM

[72] Inventor: Clayton E. Quinn, Airport Lake, Roebuck, S.C. 29376

[22] Filed: Mar. 20, 1970

[21] Appl. No.: 21,318

[52] U.S. Cl. ................................................................119/5
[51] Int. Cl. ..................................................A01k 63/00
[58] Field of Search ..................................................119/3, 5

[56] References Cited

UNITED STATES PATENTS

| 3,216,395 | 11/1965 | Girard | 119/5 |
| 3,512,503 | 5/1970 | Willinger | 119/5 |
| 3,291,098 | 12/1966 | Halpert | 119/5 |
| 3,288,110 | 11/1966 | Goldman et al. | 119/5 |
| 3,255,731 | 6/1966 | Girard | 119/5 |

Primary Examiner—Aldrich F. Medbery
Attorney—B. P. Fishburne, Jr.

[57] ABSTRACT

A transparent aquarium tank has a permanently built-in divider wall forming compartments for mature fish and new-born fish. The breeding compartment containing the mature fish has a narrow passage at the bottom through which the new-born fish gravitate into the separate compartment where they are protected from cannibalism. The divider wall has removable panels to facilitate cleaning and decorating of the aquarium, and also allow opening up of the aquarium when not in use for breeding purposes.

2 Claims, 2 Drawing Figures

INVENTOR
CLAYTON E. QUINN

BY B.P. Fishburn Jr.
ATTORNEY

AQUARIUM HAVING BUILT-IN MEANS TO PREVENT CANNIBALISM

A number of devices are known in the prior art to facilitate breeding tropical fish and the like without the hazard of cannibalism. One example of the prior art is shown in U.S. Pat. No. 3,216,395 to Girard. In general, the prior art devices involve attachments or trap chambers which are suspended mechanically inside of a main tank and generally have a restricted outlet through which the baby fish are discharged from the trap chamber into the main tank by forced circulation of water, the mother fish being compelled to remain in the trap chamber. These attachment devices are somewhat awkward and unattractive in appearance and present cleaning difficulties and require the use of a pump.

The objective of this invention is to improve upon the related prior art devices of the type exemplified by the Girard patent through the provision of a built-in integral transparent wall or partition structure in an aquarium tank which involves no temporary suspended attachments and does not detract from the general appearance of the aquarium. The structure of the invention, while not requiring the use of a circulating pump, allows such a pump to be employed in conjunction with a filter or the like, if desired. An important feature of the permanently built-in structure resides in the provision of readily removable large panels which facilitate cleaning the aquarium and also open the aquarium so as to form one main chamber when the aquarium is not being used for breeding purposes.

Other objects and advantages of the invention will be apparent during the course of the following detailed description.

BRIEF DESCRIPTION OF DRAWING FIGURES

DETAILED DESCRIPTION

Figure 1:
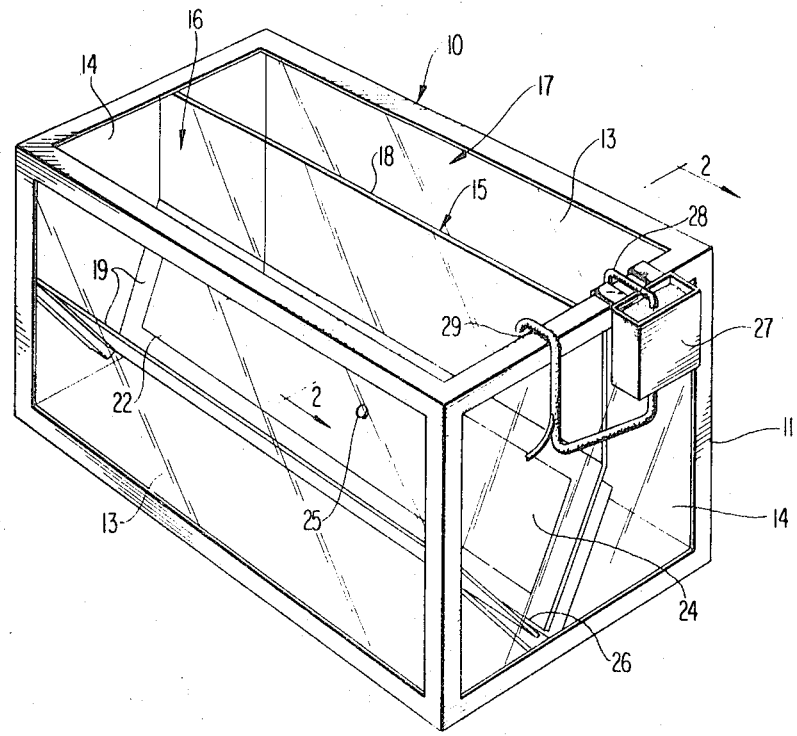
FIG. 1 is a perspective view of a fish breeding tank embodying the present invention.

Referring to the drawings in detail wherein like numerals designate like parts throughout the same, the numeral 10 designates generally a rectangular aquarium tank which has an outer rigid support frame formed of metal or the like, indicated at 11, and including rigid angle bars which extend along all edges or corners of the tank 10. The top of the tank is open, while the bottom wall 12, side walls 13 and end walls 14 are all formed of glass or other transparent material, thus rendering the entire tank transparent except for the narrow corner portions encompassed by the frame 10. The several transparent walls of the tank may be integrated and sealed against leakage in any conventional manner.

Figure 2:
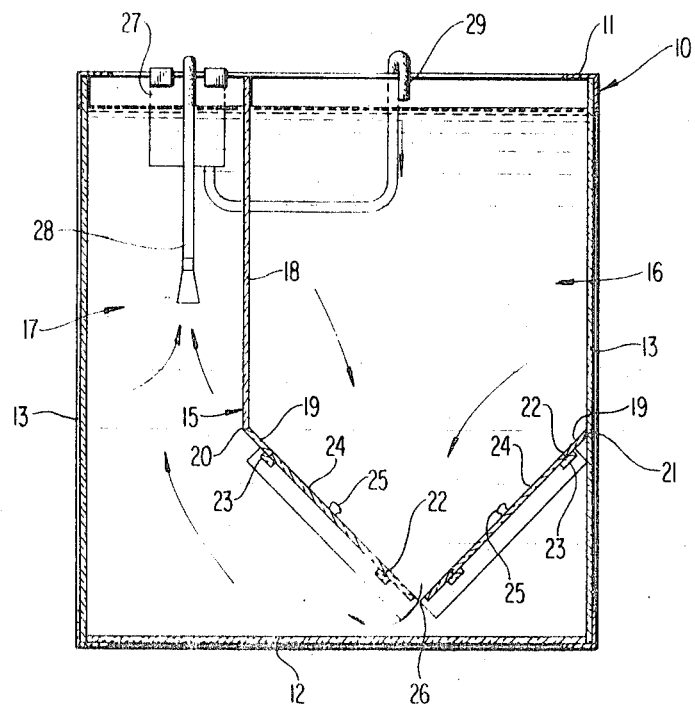
FIG. 2 is a vertical cross sectional view taken on line 2—2 of FIG. 1.

An interior transparent divider wall or panel structure 15 is provided dividing the aquarium tank into a breeding chamber or compartment 16 and a second compartment 17 for newborn fish. The divider wall structure 15 includes a vertical transparent divider wall 18 preferably extending for the entire distance between the tank end walls 14 and integrally joined therewith. The vertical wall 18 is offset laterally somewhat from the transverse center of the tank so as to be spaced more distantly from one side wall 13 than the opposite side wall, FIG. 2. The top edge of the vertical wall 18 is preferably flush with the top edges of the side walls 13, while its lower end terminates a substantial distance above the tank bottom wall.

The divider wall structure further comprises a pair of downwardly converging transparent wall sections 19 arranged substantially at right angles and having their upper horizontal edges joined integrally or effectively sealed to the lower edge of the wall 18 and to the adjacent tank side wall 13, as indicated at 20 and 21. Each inclined wall section 19 has a large rectangular opening 22 formed therethrough and spanning the major area of the inclined wall and each such opening is bounded by a transparent marginal flange 23 suitably secured to the bottom side of the wall 19 and extending around the entire margin of the rectangular opening 22. Removably mounted within each opening 22 and resting upon the underlying flange 23 is a transparent rectangular plate 24 having a lifting knob 25 secured thereto. The plate 24 is flat and has the same thickness as the wall section 19 and when resting on the flange 23 is flush with the top face of wall section 19 so that a smooth continuous inclined transparent panel or wall is formed.

A narrow elongated escape slot 26 for the new-born fish is formed between the spaced parallel lower edges of wall sections 19 at the bottom of the breeding compartment 16. The new-born fish will simply gravitate through this narrow slot and pass from the compartment 16 into the safety compartment 17 where they are saved from cannibalism. The larger mother fish cannot escape from the breeding compartment 16 because the slot 16 is too narrow.

While it is not necessary to employ a pump for circulating water downwardly through the breeding compartment 16 and upwardly in compartment 17, such circulation may be employed if desired to further facilitate the movement of newborn fish down through the slot 26. As shown in the drawings, a suitable small pump and filter unit 27 may be suspended from the top edge of one wall of the tank, with an inlet tube 28 extending downwardly into the compartment 17 and a discharge tube 29 leading into the top of compartment 16. This is an optional feature and the pump and filter unit may be omitted entirely, if preferred, without detracting from the utility of the aquarium structure for breeding tropical fish and the like.

When the aquarium is not employed for breeding, the large plates or panels 24 are removed, thus placing the two chambers 16 and 17 in open communication and allowing free passage of fish throughout the tank. Since the parts are all transparent, the presence of the wall 18 and narrow frame portions of walls 19 is hardly noticeable to the eye. Additionally, the ready removability of the plates 24 renders cleaning of the aquarium much easier.

It is believed that the various features and advantages of the structure over the prior art devices should now be readily apparent without the necessity for further description.

It is to be understood that the form of the invention herewith shown and described is to be taken as a preferred example of the same, and that various changes in the shape, size and arrangement of parts may be resorted to, without departing from the spirit of the invention or scope of the subjoined claims.

I claim:

1. A breeding aquarium for tropical fish and the like comprising a transparent tank, a transparent partition wall within the tank forming a permanent integral part of the tank and defining therein an internal breeding compartment for fish, said breeding compartment having a restricted exit opening for newborn fish allowing such fish to leave the breeding compartment and enter the remaining portion of the tank which constitutes a safety compartment to protect the newborn fish from cannibalism, said transparent tank being rectangular and having an open top, said transparent partition wall extending for the full length of the tank between two opposing side walls thereof and being permanently joined to said side walls, said partition wall including opposed sloping downwardly converging wall sections having their lower ends terminating in spaced relation near the bottom of the tank to define said restricted exit between said lower ends in the form of a restricted slot, said slot extending for the entire length of the tank, one of said sloping wall sections having its top permanently joined with an adjacent tank side wall, each sloping wall section having a large rectangular opening spanning the major area thereof and having flange means adjacent said opening, and a readily removable plate section on each sloping wall section engageable within the opening of said section and resting on said flange means and being transparent.

2. A breeding aquarium for tropical fish and the like comprising a transparent tank, a transparent partition wall within the tank forming a permanent integral part of the tank and defining therein an internal breeding compartment for fish, said breeding compartment having a restricted exit opening for newborn fish allowing such fish to leave the breeding compartment and enter the remaining portion of the tank which constitutes a safety compartment to protect the newborn fish from cannibalism, said transparent partition wall extending for the full length of the tank between two opposing side walls thereof and being permanently joined to said side walls, said partition wall including opposed sloping downwardly converging wall sections having their lower ends terminating in spaced relation near the bottom of the tank to define said restricted exit between said lower ends in the form of a restricted slot, said slot extending for the entire length of the tank, one of said sloping wall sections having its top permanently joined with an adjacent tank side wall, each sloping wall section having a large opening spanning a major area portion thereof, and a readily liftable and removable plate section on each sloping wall section coextensive with the opening of such wall section.

* * * * *